Aug. 11, 1959  E. W. YOUNG  2,899,162
SUPPORTING RACK
Filed Dec. 21, 1956
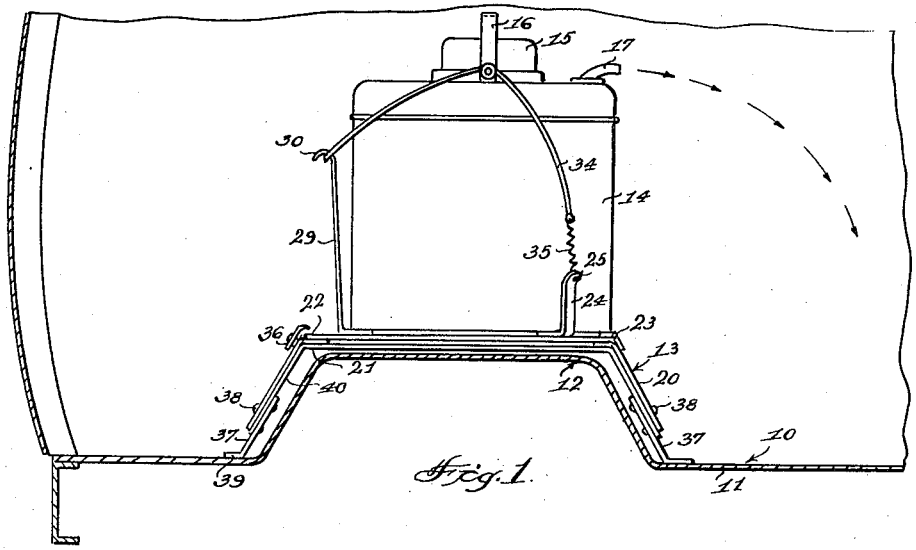
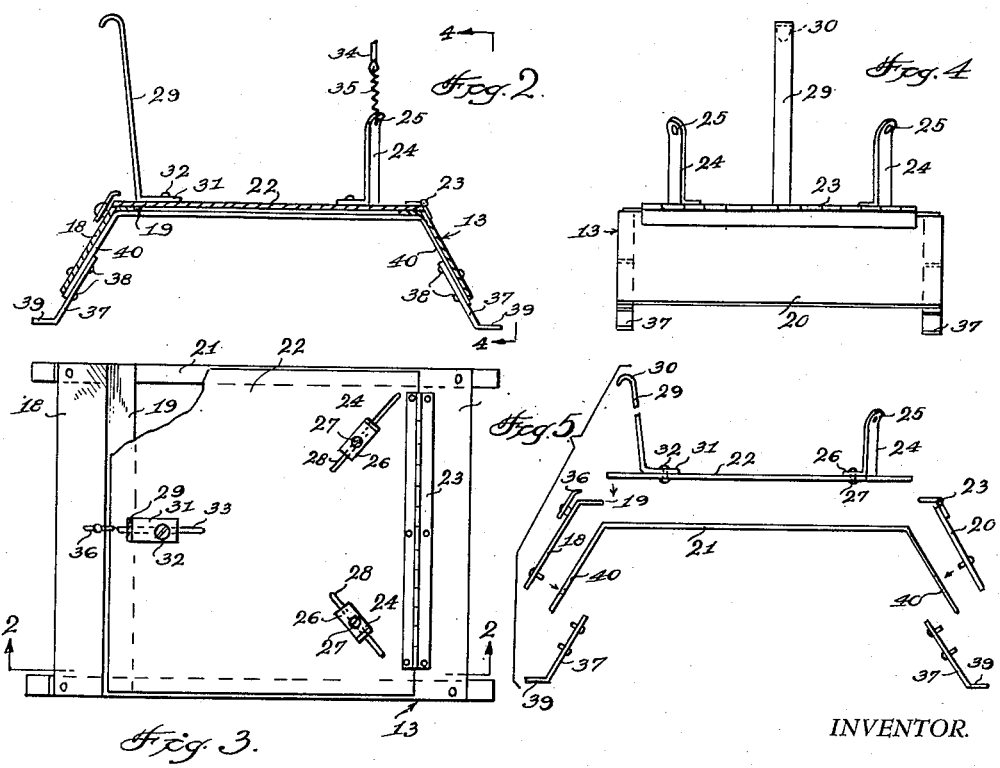
INVENTOR.
ELBERT W. YOUNG
ATTORNEYS

United States Patent Office 2,899,162
Patented Aug. 11, 1959

2,899,162

SUPPORTING RACK

Elbert W. Young, Lubbock, Tex.

Application December 21, 1956, Serial No. 629,859

3 Claims. (Cl. 248—140)

This invention relates to a supporting rack, and more particularly to a rack or stand for use in a vehicle.

The object of the invention is to provide a rack or stand which is adapted to be used for supporting containers of fluid in a vehicle such as an automobile, truck or the like.

Another object of the invention is to provide a supporting rack which is adapted to be mounted in a vehicle such as an automobile, and whereby the rack is constructed so that it can be used for conveniently straddling the ridge or hump which is arranged in the floor of the vehicle, such hump having the usual vehicle driveshaft extending therethrough, whereby the rack of the present invention provides a means for supporting jugs or containers of fluid such as water which are readily accessible to occupants of the vehicle.

A further object of the invention is to provide a supporting rack which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a sectional view illustrating the rack of the present invention mounted in a vehicle and showing a container or jug being supported thereon.

Figure 2 is a sectional view taken on the line 2—2 of Figure 3, and showing the rack per se.

Figure 3 is a plan view of the supporting rack, with parts broken away and in section.

Figure 4 is a sectional view taken on the line 4—4 of Figure 2.

Figure 5 is a fragmentary elevational view showing the parts of the rack in disassembled position.

Referring in detail to the drawings, the numeral 10 indicates in Figure 1 a portion of a conventional vehicle such as an automobile or truck, and the vehicle 10 includes the usual floorboard 11 which has a hump or ridge 12 therein, it being understood that the usual vehicle driveshaft extends through the ridge or hump 12.

The present invention is directed to a supporting rack or stand which is indicated generally by the numeral 13, and the rack 13 is constructed so that it will conveniently fit over the ridge 12 whereby the various articles can be conveniently supported on the rack 13. For example as shown in Figure 1 a jug or container 14 is being supported on the rack 13, and the container 14 is of conventional construction and may be used for holding any desired type of material such as water or other liquid. The container 14 includes the usual cap 15, handle 16, and may include a pouring spout 17.

The supporting rack 13 of the present invention includes a pair of side walls 18 and 20 which are arranged angularly with respect to each other. Extending inwardly from the upper edge of the side wall 18 is a horizontally disposed flange 19. Extending between the pair of side walls 18 and 20 and secured thereto in any suitable manner, is a pair of spaced parallel horizontally disposed bars 21. A plate 22 has one edge hingedly or pivotally connected to the side wall 20 through the medium of a hinge connection 23, Figure 3.

Extending upwardly from the plate 22 and adjustably connected thereto, is a first and second arm 24. An aperture or opening 25 is arranged in the upper end of each arm 24, and there is provided on the lower end of each arm 24 a horizontally disposed flange 26. Suitable securing elements such as bolt and nut assemblies 27 extend through the flanges 26 and through slots 28 which are arranged in the plate 22. Thus, by loosening the bolt and nut assemblies 27, the arms 24 can be adjusted or moved on the plate 22 so as to permit the rack to accommodate containers 14 of different sizes.

There is further provided a third arm 29 which extends upwardly from the plate 22 and is adjustably connected thereto, and a hook or curved finger 30 is arranged on the upper end of the arm 29. A horizontally disposed flange 31 is arranged on the lower end of the arm 29, and the flange 31 has a suitable securing element 32 extending therethrough, the securing element 32 also extending through a slot 33 in the plate 22.

A means is provided for retaining the container 14 on the plate 22 so that the container will not accidentally fall therefrom. This means comprises a cable 34 which has a portion thereof arranged in engagement with the hook 30, and springs 35 serve to connect the ends of the cable 34 to the openings 25 in the arms 24. Portions of the cable 34 extend through the handle 16 of the jug or container 14 whereby the container 14 will be maintained anchored on the plate 22. A movable latch or keeper 36 is pivotally connected to the side wall 18, so that the latch 36 can be used for maintaining the plate 22 in a horizontal position. However, by manually moving the latch 36, the plate 22 can be pivoted about the hinge 23 so that for example the fluid in the container 14 can be readily poured or dispensed through the pouring spout 17, as indicated by the arrows in Figure 1.

Connected to each of the side walls 18 and 20 is a pair of legs 37, and these legs 37 may be connected to the side walls through the medium of suitable securing elements 38. A horizontally disposed foot or flange 39 is arranged on the lower end of each leg 37. By loosening the securing elements 38, the legs 37 can be extended or retracted whereby the rack 13 can be mounted in vehicles which have different sizes of ridges or humps 12.

The bars 21 are provided with inclined end portions 40 which are arranged contiguous to the undersurface of the side walls and are secured thereto in any suitable manner, as for example as shown in Figure 5.

From the foregoing, it is apparent that there has been provided a rack which is especially suitable for use in supporting various articles such as containers in vehicles such as automobiles or trucks. In use, the rack 13 is adapted to be positioned in the vehicle so that it straddles the ridge or hump 12 which is arranged along the floorboard of the vehicle, the ridge 12 extending over the usual vehicle driveshaft. The rack 13 has a substantial U-shape so that it will conveniently fit over the ridge 12, and the rack 13 provides a support for the container 14. However, it is to be understood that other articles besides the container 14 can be supported on the rack 13.

The rack 13 may be constructed of a suitable material and in any desired shape or size. The rack 13 includes legs 37 which can be adjusted so as to permit the rack to fit vehicles of different sizes or shapes, and after the legs 37 have been adjusted to the desired position, the securing elements which hold these legs in place can be tightened so as to maintain the parts immobile in their adjusted positions. There is further provided the hingedly mounted plate 22 which supports the container 14 so that by turning the latch 36, the liquid in the container 14 can be readily poured from the spout 17 without the necessity of untying or removing the cable 34. The container 14 is maintained on the plate 22 by means of the cable 34, and the cable 34 extends through the handle 16 and engages the hook 30 on the arm 29. The ends of the cable 34 have coil springs 35 connected thereto, and these springs 35 are arranged in engagement with openings 25 in the upper ends of the arms 24. As previously described, the arms 24 and 29 are adjustably connected to the plate 22 by means of the securing elements 27 and 32 so that by loosening these securing elements, the arms 24 can be adjusted or moved towards and away from each other whereby containers of different sizes can be accommodated or received therebetween. Due to the provision of the springs 35, when it is desired to remove the container 14 from the rack 13, it is only necessary to disengage the cable 34 from the hook 30 whereby the cable 34 can be removed from the handle 16 so that the container 14 can be lifted off of the plate.

While the rack has been illustrated and described for use in a vehicle, it is to be understood that the rack can be used in other locations. In certain instances the hold down cord or cable 34 can be eliminated, as for example when a jug of the type which has a bottom spout is being supported. As previously described, due to the provision of the hinged plate 22, the jug 14 can be tilted without the necessity of untying the cable 34 since it is only necessary to loosen the latch 36 in order to permit the plate 22 and jug 14 to be tilted as when the liquid is being dispensed or poured from the spout 17.

Thus, it will be seen that there has been provided a rack which is adapted to be positioned above the ridge or hump in a vehicle and the rack can be arranged in front of the vehicle or in the rear thereof. Thus, the container will be supported in a position so that it will not interfere with the driving or use of the vehicle and water or other liquid can be dispensed from the container without the necessity of lifting the container, and this is due to the provision of the hinged plate. The cable 34 may consist of wire which is covered with a suitable flexible or plastic material and this cable can be readily hooked or unhooked from the finger 30.

I claim:

1. In a supporting rack, a first and second side wall arranged angularly with respect to each other, spaced parallel bars extending between the upper edges of said side walls and secured thereto in elevated relation to the lower edges of said side walls, a plate hingedly connected to the upper edge of one of said side walls, a latch on the other of said side walls for selectively maintaining said plate in a horizontal position in engagement at its opposite edges with said parallel bars, first and second arms extending upwardly from said plate and said arms having openings therein adjacent their upper ends, flanges on the lower ends of said arms adjustably connected to said plate, a third arm extending upwardly from said plate and including a curved finger on its upper end, a flange on the lower end of said third arm adjustably connected to said plate, a cable arranged in engagement with said finger, and coil springs connected to said cable and arranged in engagement with the openings in the upper ends of said first and second arms.

2. In a supporting rack, a first and second side wall arranged angularly with respect to each other, spaced parallel bars extending between the upper edges of said side walls and secured thereto in elevated relation to the lower edges of said side walls, a plate hingedly connected to the upper edge of one of said side walls, a latch on the other of said side walls for selectively maintaining said plate in a horizontal position in engagement at its opposite edges with said parallel bars, first and second arms extending upwardly from said plate and said arms having openings therein adjacent their upper ends, flanges on the lower ends of said arms adjustably connected to said plate, a third arm extending upwardly from said plate and including a curved finger on its upper end, a flange on the lower end of said third arm adjustably connected to said plate, a cable arranged in engagement with said finger, and coil springs connected to said cable and arranged in engagement with the openings in the upper ends of said first and second arms, said cable adapted to engage a container being supported on the plate, and said rack straddling a ridge on the floor of a vehicle.

3. In a supporting rack, a first and second side wall arranged angularly with respect to each other, spaced parallel bars extending between the upper edges of said side walls and secured thereto in elevated relation to the lower edges of said side walls, a plate hingedly connected to the upper edge of one of said side walls, a latch on the other of said side walls for selectively maintaining said plate in a horizontal position in engagement at its opposite edges with said parallel bars, first and second arms extending upwardly from said plate and said arms having openings therein adjacent their upper ends, flanges on the lower ends of said arms adjustably connected to said plate, a third arm extending upwardly from said plate and including a curved finger on its upper end, a flange on the lower end of said third arm adjustably connected to said plate, a cable arranged in engagement with said finger, and coil springs connected to said cable and arranged in engagement with the openings in the upper ends of said first and second arms, legs adjustably connected to said side walls, and outwardly extending feet on the lower ends of said legs.

References Cited in the file of this patent

UNITED STATES PATENTS

| | | |
|---|---|---|
| 630,734 | Oothout | Aug. 8, 1899 |
| 1,102,972 | Woodworth | July 7, 1914 |
| 1,639,563 | Hays | Aug. 16, 1927 |
| 2,036,115 | Branch | Mar. 31, 1936 |